March 1, 1955 A. C. PETERSON 2,703,147
CYCLIC PITCH CHANGING MEANS FOR HELICOPTERS
Filed June 26, 1950 4 Sheets-Sheet 3
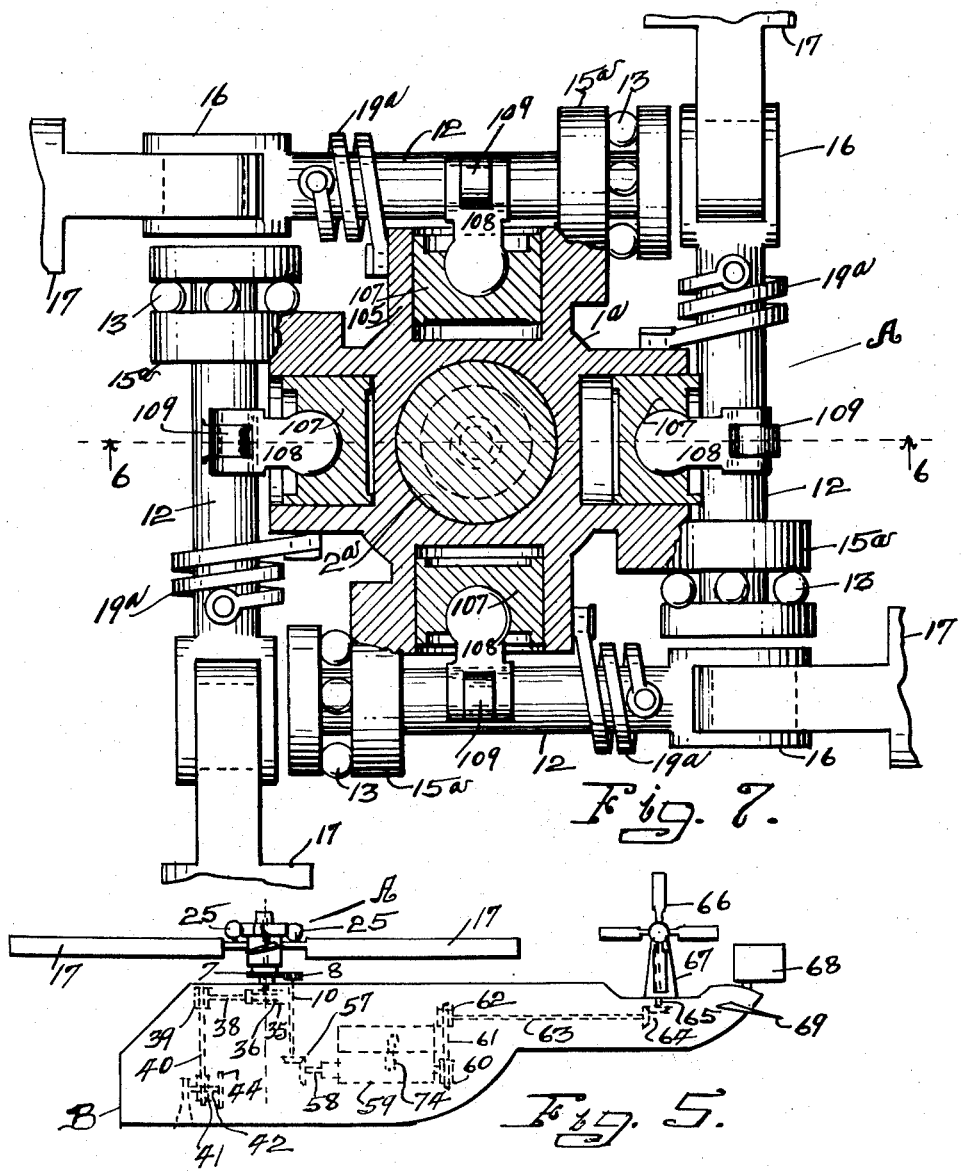
Inventor
Adolphe Peterson

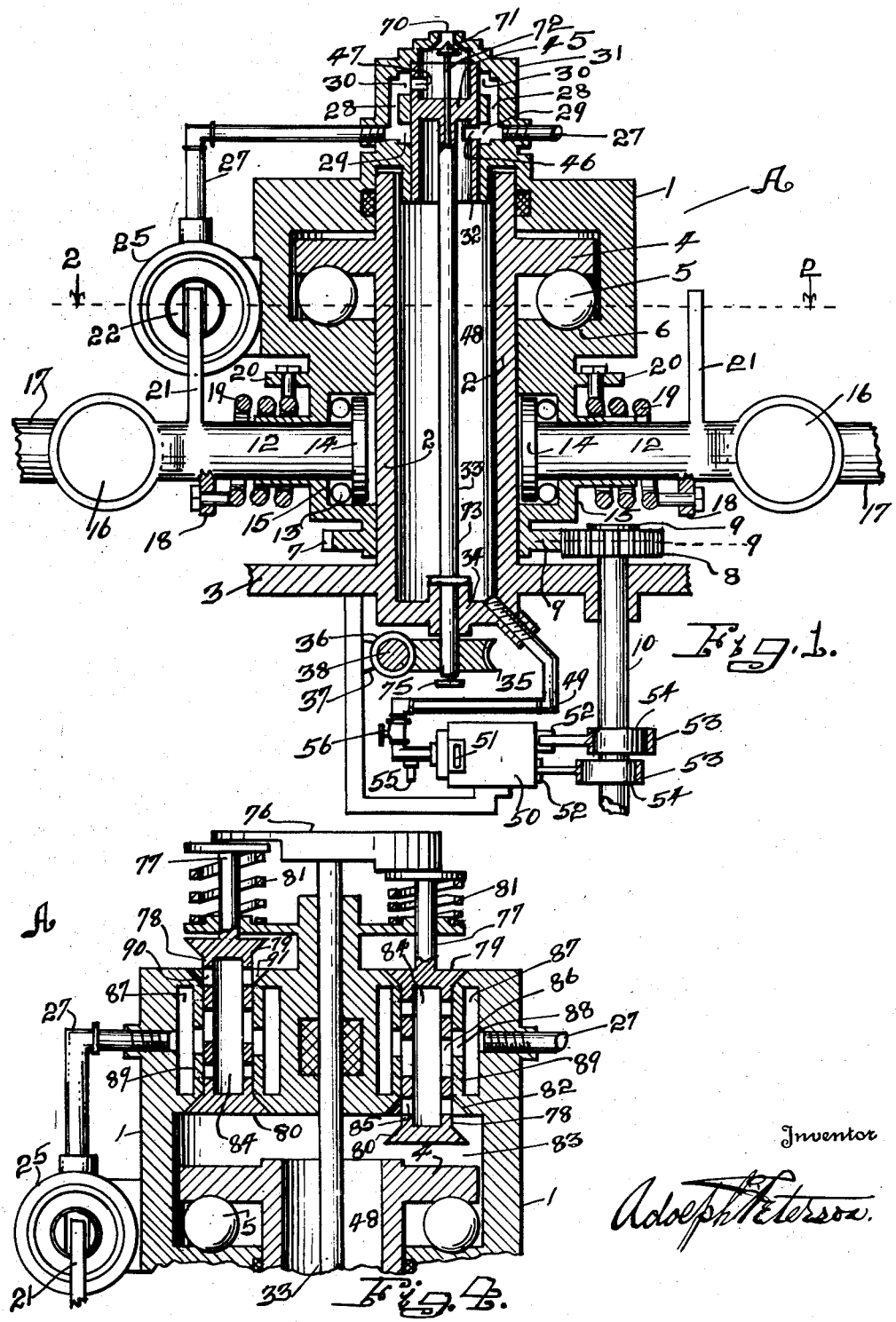

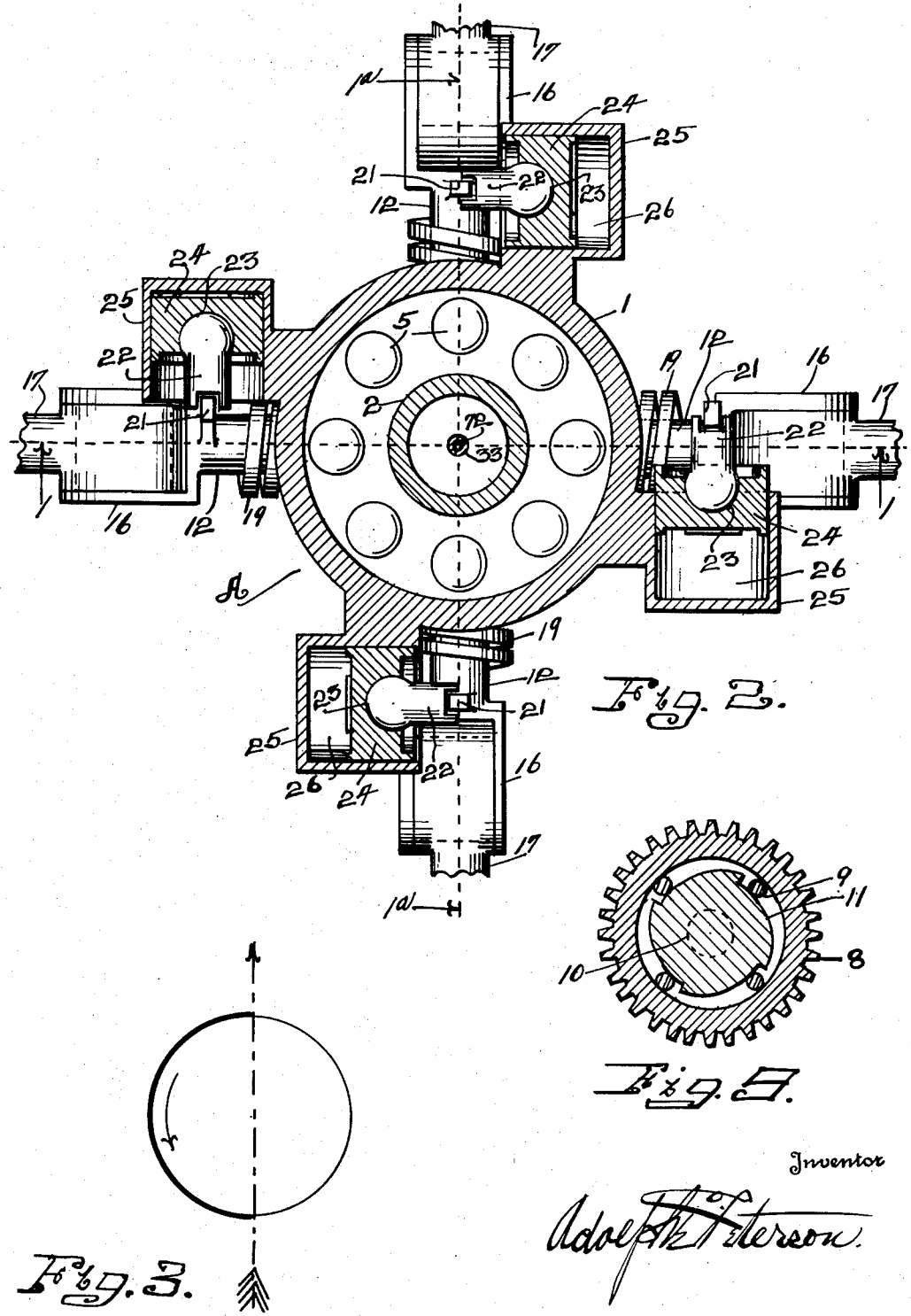

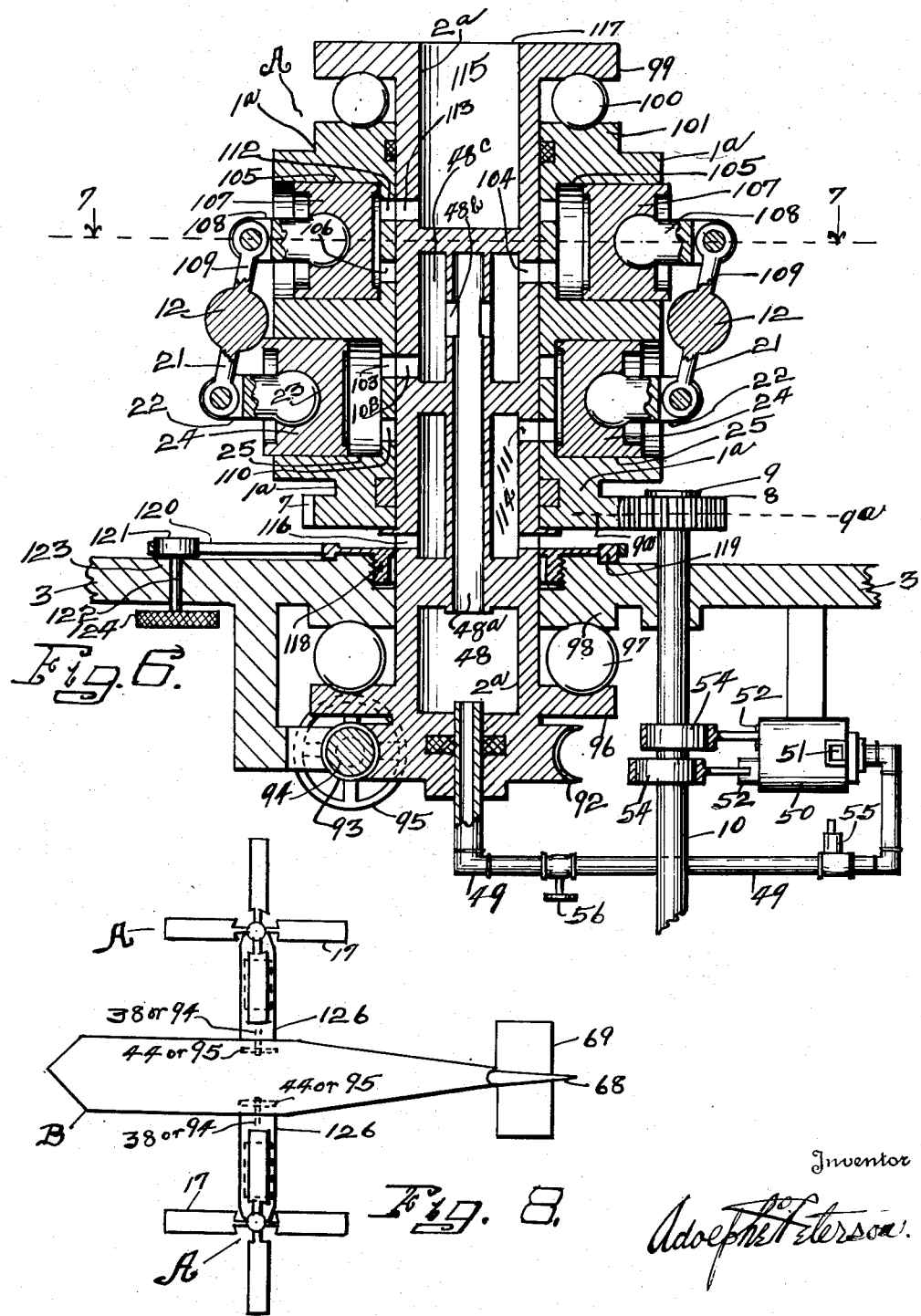

United States Patent Office 2,703,147
Patented Mar. 1, 1955

2,703,147

CYCLIC PITCH CHANGING MEANS FOR HELICOPTERS

Adolphe C. Peterson, Edina, Minn.

Application June 26, 1950, Serial No. 170,276

12 Claims. (Cl. 170—160.25)

My invention relates to helicopters or rotary wing aircraft and particularly to a means for cyclic changing of pitch, wherefore it is called, cyclic pitch changing means for helicopters.

The principal objects of my invention are to provide an improved means for cyclic pitch change in rotary wing aircraft, which improved means shall be simple in construction, effective in operation, efficient in operation, and which shall have certain other advantages. A chief object is to provide such pitch changing means for the cyclic change of the angle of blades which means shall be stronger and more reliable in use, and does not necessitate the numerous and delicate small parts which are usually needed for the accomplishment of cyclic pitch change in the helicopter type of aircraft. A chief object is to provide a means for the use stated which means shall be more easily controlled by manual control means and which shall more easily be adapted to different conditions of travel or flight during travel. Another object is to provide such a means as will automatically and quickly adopt the position for automatic slow descent when the power plant fails to perform its function of driving the rotor of the aircraft. An object is to provide a means for the purpose described, which does not require the use of the cumbersome and complex swash-plate for the accomplishment of cyclic pitch change but substitutes a means for such use which is strong and is not readily damaged in use. In general the object is to provide an improved helicopter type aircraft which is more easily controllable due to its type of actuation means, whether there is a single rotor or any number of rotors, and which is better in performance than the type of helicopter rotor means which has been used or produced.

The principal devices and combinations of devices are as hereinafter described and as defined in the claims. In the accompanying drawings which illustrate my invention in several different forms, like characters refer to like parts throughout the several views, in so far as practicable.

Referring to the drawings:

Figure 1 is a view in vertical section on the line 1—1 of Figure 2, and showing principally a vertical section on a plane passing vertically through the axis of the hub of a wing rotor constructed according to my invention, some parts being shown in full side elevation and some parts being broken away.

Figure 2 is a view in horizontal cross section on the line 2—2 of Fig. 1, this view showing the horizontal section through the horizontally disposed cylinders of the pitch changing means, the bearing axles or shafts of the rotor blades with the hinges of the blades being shown below that plane in full plan view, the blades being broken away.

Figure 3 is a diagrammatic sketch showing in a general manner the cycle of operation of any blade or blades of the device.

Figure 4 is a section on a vertical plane through the axis of the hub of a modified form of my device, to show a modified form of my device, to show a modified form of valve controlling means which effects the pitch changing of blades, one of the cylinders of the pitch changing means being shown in end view with its piston means, some parts in side elevation, some broken away.

Fig. 5 is a view in side elevation of an aircraft of the helicopter or rotary wing type, embodying my invention, this view being on a very small scale and showing the rotary wing device on a much reduced scale.

Figure 6 and Figure 7 are views of a modified form of my device, to show a somewhat modified form of cyclic change actuating means. Fig. 6 is a view of a section of a vertical plane on the line 6—6 of Fig. 7, the section passing vertically through the axis of the hub of the rotor carrying the blades, showing principally the hub driving means, and the pitch changing means, some parts being broken away and some parts being shown in full side elevation.

Figure 7 is a view in horizontal section on a plane on the line 7—7 of Figure 6, this being a horizontal section through one of the sets of the cylinders of the pitch changing means, the other set on a lower horizontal plane being invisible below the set shown, some parts being broken away and the blade axles or shafts being shown in plan view on a plane below that of the set of the cylinders shown.

Figure 8 is a plan view of a rotary wing aircraft bearing two of my rotor devices mounted on it, the manually operated control wheels for the two devices being diagrammatically shown only. This view is on a very much reduced scale over that of Figures 6 and 7 or Figures 1 and 2.

Figure 9 is a detail section on line 9—9 of Figure 1. A section on line 9a—9a, Figure 6 would be similar and is therefore not shown.

Referring first to the Figures 1 and 2, which show chiefly only the blade driving and the pitch changing means, 1 is the rotor hub, 2 the fixed pylon shaft of a sleeve type, 3 the pylon mounting or fixture which is part of the fuselage structure of the aircraft on which the device may be mounted for use, 4 is the bearing flange fixed on the upper end of the pylon shaft 2 and against which the upward thrust of the blade rotor is exerted, 5 the ball bearing upon which and through which the upward thrust is effected by the upward bearing face 6 of the hub 1, 7 is a large spur gear fixed on the lower end of the hub 1 and by which the hub is driven by the motor driving means, 8 is the small spur gear in permanent engagement with the large spur gear 7 for driving the latter, 9 (see Fig. 9) is a one-way clutch by which the spur gear 8 may be driven in one direction only and may be freed for auto-rotation when not power driven, 10 is the power driven shaft by which the internal driving part 11 of the one-way clutch is driven, 12 denotes each of four blade axles or shafts which are mounted on a horizontal axes in the hub 1 and are retained against centrifugal force of the blades by the ball-bearings 13 which individually provide frictionless thrust of the axle flanges 14 of the blade axles 12 against the outer bearing flanges 15 formed in the hub 1, 16 are the individual blade hinges whi provide for articulation of the individual blades in the vertical planes of the blades, 17 are the individual rotor wing blades, and of the latter there are four.

It is contemplated that the individual rotor wing blades 17 may be hinged to their individual blade axles 12 in any way as such rotor blades are commonly mounted on their root axles, and they are and may be limited in their movement by any means as such blades are usually limited in their movement about or on their hinges or means by which they are attached to their roots as the axles 12. Each blade 17 has the form which helicopter or rotary wing aircraft blades usually have in such aircraft, so that they will each of them effectively act as rotor wing blades to provide sustentation for the aircraft of which they are a part in lift of that aircraft and sustaining of the aircraft.

Each blade 17 has formed on or attached to its blade axle 12 a small bracket 18 to which is attached the one end of a coil spring 19. This coil spring is wound around the blade axle 12 and its opposite end is attached to the bracket 20, the latter being formed with or attached to the adjacent part of the hub 1. The arrangement of each coil spring 19 with its attachments, is such that, the tension of the spring will tend to automatically swing the associated blade 17 into that position or blade pitch, which will, in the event that all of the blades coincidentally take this automatically effected pitch angle, permit of auto-rotation of the blade rotor, generally designated A, for slow descent of the aircraft, as might be necessary in the event of power failure. The movement of each blade in that direction, that is, to the position for such auto-rotation is limited by the other actuating means which is hereafter described.

Each blade axle 12 has also formed with it or firmly attached to it, an arm 21 which extends at right angles to the axis of the axle 12 from it. Each axle arm 21 is at its extreme end in contact at its side with the extreme outer end of an associated piston rod 22 which at its inner end is mounted by a ball and socket joint 23 in the associated piston 24, the mounting being such that while the piston rod has a slight flexibility of movement no more flexible movement, that is with respect to its associated piston 24, is permitted than is necessary to permit reciprocation.

Each piston 24 is reciprocable in a cylinder 25 and the latter is formed with or firmly fixed on the hub 1. There are thus four pistons 24, each of which is reciprocable in one cylinder 25. The closed chamber or space 26 within each cylinder 25, between it and its piston 24, is in continuous or free connection by means of an individually associated pipe 27 with an individually associated small conduit chamber 28, there being four of the latter, one associated with each cylinder 25. Each conduit chamber 28 has two ports, one an intake port 29 and the other a discharge port 30, these ports being formed in the cylindrical wall interiorly of a valve housing 31 which is formed with or fimly fixed on hub 1, at its top to revolve with the hub 1. Within valve housing 31 which is formed with or firmly fixed on hub 1, at may revolve on it or around it as a bearing and in close fit with it, a normally stationary valve 32 which is fixed on the upper end of a valve rod 33 which extends axially downward through the internal bore of the pylon shaft 2 and through a bearing 34 formed in the lower end of the pylon shaft 2, where on the lower side of bearing 34, the valve rod 33 has fixed on it a worm wheel 35, the latter being in permanent engagement with a worm wheel or pinion 36. The small worm wheel 36 is rotatably mounted in bearing means 37 fixed to the pylon mounting 3 or fuselage structure. The shaft 38 of the worm pinion 36 has fixed on its opposite end within the fuselage structure, a sprocket wheel 39 and this is in permanent engagement with sprocket chain 40 and through the latter with sprocket wheel 41, the latter being fixed on shaft 42 which is rotatable in bearing fixture 43 and has fixed on it also the hand wheel 44 whereby the sprocket wheel and chain and sprocket wheel 39 and worm pinion 36 may be turned to thereby alter the rotational position of worm wheel 35 and valve rod 33 and valve 32, so that this means thereby provides for changing the relative position of the valve 32 in the valve housing 31 and thereby the relative positions of the ports 29—30.

The valve 32 has a bisecting wall 45 internally of it and it has in its side wall two ports, one inlet port 46 and one discharge port 47, one on one side of wall 45 and the other on the other side of wall 45, whereby one port 46 will provide connection periodically in rotation of valve housing 31 with the valve housing ports 29 and the other 47 will provide connection with the housing discharge port 30 periodically in rotation of the valve housing 31. The location of the valve ports 46 and 47 is such, at diametrically opposite sides of the valve 32 that the connection with any port in the valve housing 31 is thus determined, and that connection is during one half or less of the revolution of valve housing 31 with the inlet port 29 and during the other half of the rotation of valve housing 31 the connection is through the discharge port 47 and the discharge port 30. The connection of ports 46 and 29 is during the one-half period which is the inlet period during which air from bore 48 of pylon shaft 2 will flow from bore 48 through ports 46 and one port 29 to one pipe 27 and thereby to one cylinder 25. The connection during inlet periods with ports 29 may overlap, and the connection during exhaust periods through ports 30, may also overlap, the amount or degree of this overlapping being determined in any particular construction, by the characteristics desired in the particular rotor.

The thrust of the pistons 24 outwardly from their cylinders under the action of air pressure in the cylinders 25 is opposite to the thrust of action of the blades 17 as caused by the tension of the coil springs 19, so that whenever air under pressure enters any cylinder 25 it will cause the piston 24 therein to move outwardly and thereby cause the arm 21 of the particular axle 12 and blade 17 to be thrust in a direction to turn the blade into the position of increased pitch angle so that the blade will thereby have the angularity or pitch in its movement in rotation of the rotor, which is necessary to cause not only the backward thrust which procures forward propulsion of the aircraft but also that increased upward thrust upon the blade and the rotor hub 1 which will procure the necessary sustentation or sustaining force upon the aircraft as necessary for continued flight.

The degree of turning of the blade 17 against the tension of the individual coil springs 19 will be determined at any time by the pressure of the air in the bore of the pylon shaft 2, and this degree of turning will in turn determine the proportion of lift effect and propulsion effect also given by the blades in the so-called propulsion cycle of their rotation, and this variable effect may be used to vary the lift or climb effect upon the aircraft in flight. Air under pressure will in normal course enter the bore of the pylon shaft 2 and be there distributed to the cylinders 25 by the valve means described and this air will be supplied by the air pipe 49 and the latter is supplied by the two-cylinder air pump 50 which receives air from the atmosphere by means of the intake 51 and has pistons 52 reciprocated by pump rods 53 operated by eccentrics 54 on the shaft 10. The air supplied to pipe 49 is controlled as to maximum pressure by means of a safety valve 55 or any means in lieu thereof, and it is controlled as to pressures under the maximum by means of a hand valve 56, or any other means in lieu thereof. The safety valve 55 will permit ejection of some air to atmosphere whenever the air pressure between the air pump and hand valve 56 exceeds the maximum pressure as determined by the safety valve 55.

The shaft 10 is operated as through the bevel gears 57 by the engine crank shaft 58 of engine 59, and the crank shaft thereof may also by means of sprocket wheel 60, chain 61, sprocket wheel 62, and shaft 63 also drive bevel gears 64, shaft 65 and thereby torque counteracting small air propeller 66 by any means (not shown) within the propeller mounting 67. The aircraft fuselage generally designated B has rear horizontal rudder 68 and elevator means 69 as in the usual aircraft for direction in flight.

The upper side of the valve 32 to which the ports 30 and 47 deliver, has continuous discharge to atmosphere by way of the single discharge port 70 and this discharge is calculated to produce the minimum desired angle of the pitch of the blades 17 in powered actuation of the rotor A, as desired to produce most efficient operation and flight. The discharge port 70 has associated therewith a discharge control valve 71 which may be moved upwardly or downwardly so as to diminish or increase the passage through discharge port 70 by means of a control rod 72 to which the control valve 71 is fixed. The control rod 72 is passed through a bore in the valve rod 33 and at its lowermost end beneath the valve rod 33 there is a knurled head 75 attached to control rod 72 and the latter is screwable in a thread interiorly of the bore in the valve rod 33 so that its position may thereby be altered vertically with respect to valve rod 33. The valve rod 33 is fixed vertically, although rotatable as stated, by means of a flange 73 on valve rod 33 above its lower bearing, or by any other means. The control valve 71 does not at any time completely close the discharge port 70 as the latter in flight has some opening, and therefore the valve 71 does not touch the metal around the discharge port 70. There being always some opening in discharge port 70, there will always be permitted continuous discharge during operation, and there will, in the event of power failure in driving of rotor A, be discharge of air until the air pressure is completely relieved in the cylinders 25 and thus the position or pitch for auto-rotation of the rotor A, will always be automatically accomplished in the event of power failure.

Having described in detail the construction of the rotor means and its control, the operation is now described in respect to the general use of the device in flight. The engine 59 has a carburetor or other control means 74 by which the pilot may cause the engine to deliver more or less power in operation. The engine will be supplied with fuel by any means not shown. Prior to take-off, the pilot will have adjusted the control rod 72 by means of knurled head 75 so that there will be discharge by port 70 but so that this discharge is only that which permits the maximum lifting effect of blades 17 by permitting minimum discharge through discharge port 70. If now the operator causes engine 59 to accelerate and deliver the required power, the shaft 10 and thereby the hub 1 with the blades 17 attached are rotated in the proper direction of rotation of the blades 17 for lift effect, and at the same time the pump 50 is actuated so that air is pumped from the atmosphere to the bore 48 of the pylon shaft 2, and as the hub 1 rotates, the air under pressure will enter the individual cylinders 25 in cyclic order and periodically once during each rotation of rotor A, as permitted by the inlet ports of the valve housing 31 and the valve 32, as stated. The valve 32 does not rotate but may be controlled as to its position, by the pilot by means of the hand wheel 44. At each entry of air to a cylinder 25 the air will thrust the associated piston 24 outwardly and this outward thrust of the piston will thrust the associated arm 21 outwardly with the piston 24 and this action will turn the blade axle 12 and blade 17 associated upon its horizontal axis, which is substantially a radius of the rotor A, into a position of higher pitch, and this higher pitch, at its maximum will be that which procures the necessary propulsive forward thrust on the aircraft and also procures the associated upward lift or sustentation effect upon the aircraft in flight and to effect climbing of the aircraft.

The pilot may at any time by means of the knurled head 75 adjust the discharge of air through the discharge port 70 and by this adjustment a variable return rotation of the blades 17 upon their own axes is secured, since there may thus be adjusted the residual pressure at any time within the cylinders 25 and this residual pressure will determine the degree to which the blades 17 are permitted to return to the minimum pitch angle under the tension of the coil springs 19, which always tend to turn the blades 17 into this small pitch angle or the smallest determined pitch angle thus determined by means of the residual pressure of air in cylinders 25. Increasing this pressure will increase the lift effect of the rotor blades 17 as their pitch angle will be greater during a greater portion of the cycle of rotor A. The control rod 72 should have a limit of movement to close discharge port 70 so the pilot will thereby be debarred from completely closing this discharge port 70, although if such a construction be desired, and that may be the case in some constructions, the control valve 71 may be permitted to completely close the discharge port 70, as the pilot desires, so that under some operation, as may be necessary, the pilot may cause the rotor A to revolve with pressure of air in the cylinders 25 at a maximum during all the portions of the cycle of rotation, so that thus the pistons 24 may be thrust out of cylinders 25 during the entire rotation, and thus there will be lift at its maximum during the entire rotation of rotor A, and this may be the desired effect when rapid climb effect is desired without any horizontal propulsion effect. Normally, however, the pilot permits some discharge through discharge port 70 and thus there will be effected the cyclic turning of the blades 17 upon their individual axes to cause the changing pitch angle which will effect propulsion horizontally and as well lift or sustentation of the aircraft.

At any time the pilot may by means of the hand wheel 44 cause the valve 32 to be adjusted in its position of rotation with respect to the pylon shaft 2 and thus with regard to the rotation of the rotor A so that thus the pilot may adjust and control the cyclic action so that he may cause the period of maximum angle of the blades 17 to shift in the horizontal plane of rotation of rotor A. This action or control will effect the same control of the cyclic action as is customary in aircraft of the well known helicopter type. By the two controls stated, the pilot has control not only of the direction of horizontal propulsive thrust but also has control of the degree of lift effect and thus of the climb or vertical effect, of rotation of rotor A. I have shown the coil springs 19 as the means which returns the blades 17 to their lower pitch angle, but I contemplate that any other means may be used for this return effect, such as any type of resilient means and this may be resilient air pressure. The pilot by use of the hand valve 56 may cause a diminishing of the air pressure as delivered by the air pump means to the bore 48 of pylon shaft 2 and thereby he may if he desires diminish the pitch angle of the blades 17 at the maximum degree of pitch angle in the cycle.

In Figure 3 is illustrated diagrammatically in a general way the phases of the cyclic action of the rotor blades 17. Each rotor blade 17 in the normal action during forward flight of the aircraft, has a cyclic action as stated, during which the blade in approximately one-half of the rotation of the rotor A, has a relatively deeper or greater pitch angle, during the backward movement of the blade, relatively to the forward direction of flight, and this phase is illustrated by the heavy part of the circle, Fig. 3, illustrating the rotation of the rotor A. During the other one-half the blade has a smaller angle of pitch, and during this one-half there is some lift effect but not so much thrust in the horizontal direction. This phase is illustrated by the lighter portion of the circle, Fig. 3. The arrow illustrates the direction of flight.

In the event of power failure, the pilot will insure that the discharge port 70 is open, and in that event the air pumps will no longer compress air into bore 48 of pylon shaft 2 and the air will completely exhaust through port 70, so that all the blades may then take the pitch angle which will permit auto-rotation of the rotor A and slow descent of the aircraft under such auto-rotation.

Referring now to Figure 4, this illustrates a modified form of air control means for the cyclic air delivery and discharge from the cylinders 25. In this form of cyclic air distribution, the valve rod 33 bears at its top a cam disk 76 and the latter is normally held stationary while the hub 1 rotates, as in the first form. The cam disk 76 cyclically depresses the valve stems 77 and the latter individually have attached the sleeve valves 78 and conical valves 79 and 80 at opposite ends of the sleeve valve 78. The individual valve stems 77 and their valves are normally elevated by the coil springs 81. There are as many valve stems 77 each having the sleeve valves 78 and valves 79–80 as there are air foil blades in the rotor A, there being shown in Fig. 4, only two of the valve means.

The lower conical valves 80 are normally seated on ports 82 between the space 83 open to bore 48 of pylon shaft 2 and the interior space 84 of the sleeve valves 78, but when any one of these conical valves 80 is lowered from its seat by action of cam disk 76 on its attached valve stem 77, communication between the space 83 and the space 84 is permitted by way of ports 85 in the side of the sleeve valve 78, and the ports 86 of the sleeve valve at the same time permit flow from space 84 to the annular space 87 by way of ports 88 in the sleeve 89 which is a part of the hub 1. From space 87 the air flow continues to the associated pipe 27 and thereby to the associated cylinder 25 where the air pressure will cause the increased pitch angle of the associated blade 17, as in the first form shown. The blades 17 are not shown in Fig. 4 but they are as in the first form shown and operate similarly for cyclic pitch change by the air pressure in the cylinders 25 and the coil springs which cause the return of the blade to its lesser pitch angle, in the opposite phases.

The sleeve valves 78 have also ports 90 in their side walls and these ports 90 permit flow from the space 84 of the valve and thereby from annular space 87 and the associated pipe 27 through ports 86—88 to the atmosphere for discharge of air pressure in the cylinder 25 associated when the sleeve valve 78 is raised and the conical valve 79 is thereby raised to open the port 91 to the atmosphere. The discharge to atmosphere is thus permitted during the phases alternate to the phases when air under pressure flows to the cylinders 25. The cyclic action is governed by the cam disk 76 which is formed to cause depression of the valve stems 77 in cyclic order and permit the valves to rise in the alternate phases.

Referring now to Figures 6 and 7, these figures illustrate a further modified form of my invention, which in general is the same as the form first described, but is modified to eliminate the action of springs 19 which by their tension cause the returning action of the blades 17, and to substitute for these coil springs 19 additional air pressure operated pistons in associated cylinders as the means to forcibly cause the return of the blades to the lesser pitch angle. These figures also show a modified form of pylon shaft means for use in this form, as in this form the pylon shaft denoted 2ª is not a permanently fixed pylon shaft but is, relatively to the fuselage fixture 3 or fuselage, oscillative or rotatable on its axis by manual control means at the will of the pilot. This manual control means consists of the large worm wheel 92 which is fixed on the lower end of pylon shaft 2ª, the smaller worm wheel or pinion 93 in permanent engagement with worm wheel 92, the pinion shaft 94 (dotted lines, Fig. 6) the hand wheel 95, Fig. 6. The shaft 94 and pinion 93 may be operated or controlled by any remote control means manually actuated or servo actuated by any means under the control of the pilot. The means shown is by way of illustration of a means for control. The pylon shaft 2ª near its lower end has a large flange extending laterally from it and this which is a flange-bearing 96 bears upwardly by means of the ball bearing 97 against the thrust bearing 98 fixed in the fuselage structure 3 or any support means.

At its extreme upper end the pylon shaft 2ª has fixed thereon or formed therewith, the axial thrust bearing 99 and the latter by means of the ball bearing 100 takes upward thrust axially of the pylon shaft by means of the thrust bearing 101 which is formed with or fixed on the upper end of the hub 1ª. The hub 1ª at its lower end has the spur gear 7 driven by means of spur gear 8 which through one way clutch 9 is driven by shaft 10 and thereby by the engine, not shown in Fig. 6. The shaft 10 drives the air pump means as in the first form and this air pump means as in the first form by means of the same control means delivers air under pressure to the cyclic air distributing means which is different in this form. The air under pressure enters the bore 48 of the pylon shaft 2ª, and passes by way of supplementary bore 48ª and ports 48ᵇ to annular space 48ᶜ and from the latter by way of port 102 formed in the side wall of pylon shaft 2ª through the cylinder ports 103 which are formed in the wall of hub 1ª to the individual cylinder 25 which is associated with an individual port 103. There is only one port 102 in pylon shaft 2ª for entry of air to cylinders 25 while each cylinder 25 has a port 103, so that entry of air to a cylinder 25 occurs during one phase of each rotation of hub 1ª on pylon shaft 2ª. The space 48ᶜ has another port 104 by which air under pressure is delivered during opposite phases of the rotation of hub 1ª to another set of cylinders 105 which are also formed in hub 1ª in a plane vertically just above the plane of cylinders 25. These cylinders 105 individually have ports 106 by which the air is permitted to enter the cylinder when a port 106 is in connection with the port 104. Each cylinder 105 is vertically just above its associated cylinder 25 and the cylinders 25 have the pistons 24 which by means of piston rods 22 connect with bracket arms 21 on individual blade axles 12 of blades 17, the air foil blades. The cylinders 105 have the pistons 107 reciprocable one in each cylinder 105 and the pistons 107 by means of connecting rods 108 connect with arms 109 of the individual blade axles 12 of blades 17, the arms 109 being extended from blade axles 12 in directions oppositely to the direction of arms 21, so that thrust on arm 109 of a blade is opposite to the thrust of a piston on the arm 21 of the same blade.

The cylinders 25 have exhaust ports 110 which individually and periodically in cyclic order pass or discharge air through the exhaust port 111 in the side wall of pylon shaft 2ª. The cylinders 105 have exhaust ports 112 which individually discharge air in cyclic order through a port 113 in the side wall of pylon shaft 2ª. The ports 111 and 113 in pylon shaft 2ª discharge the air from the cylinders into chambers 114 and 115 respectively of the pylon shaft 2ª and these chambers are distinct from chambers 48, 48ª, 48ᶜ of pylon shaft 2ª. The chambers 114—115 discharge the air by way of parts 116 and 117 to atmosphere. The ports 116 and 117 may have discharge restricting means as the first form described has. As shown, however, restricting means is limited in this form to the discharge ports 116, so that if the pilot desires he may limit discharge by means of sleeve valve 118 screwable axially of the bearing 98 by means of a pulley 119 fixed on sleeve 118. The pulley 119 is turned by a belt 120 which at its opposite end is on the small pulley 121, the latter being fixed on shaft 122 mounted in bearing 123 in fuselage fixture 3. The shaft 122 has fixed in its end inside the fuselage structure, the hand wheel 124 whereby the pilot may turn sleeve upwardly to partially cover the exhaust ports 111 or downwardly to completely open the ports 116. The belt 120 is sufficiently long and flexible that it will permit of sufficient flexibility so that the slight vertical movement of sleeve 118 is permitted, but it should be noted that any means may be used to enable the pilot to turn sleeve 118 to close or open ports 116 or any other means may be used for the purpose of closing or to open ports 116. By closing the ports 116 the pilot may cause the air under pressure to be confined in cylinders 25 or more or less restricted, as he prefers for control, and thereby the blades 17 may be prevented from returning to their minimum pitch angle positions, as when he desires to increase the climb ability of the aircraft or simply to cause it to hover over any location. Manipulation of the engine throttle to control speed of the engine may assist in this control. When the pilot desires, as in the case of engine failure, the sleeve 118 is moved to completely open ports 116, whereupon there is complete discharge from all the cylinders 25 and the other cylinders 105, and the blades 17 will automatically take the positions for slow descent by auto-rotation of rotor A. To insure that the blades take this position the coil springs 19ª are provided and they may be merely of light strength so they will accomplish this function, and their tension is such that they will cause the required turning of the blades on their individual axles 12 to take the position of pitch angle required for the autorotation of the rotor A in slow descent. Normally when ports 116 are open and the engine provides rotating power for rotor A the blades will individually take the positions of minimum or near minimum pitch angle necessary for sustentation and forward propulsion of the aircraft as in helicopters.

The ports 116 should have such capacity for flow of air by the construction design that the normal discharge is such that the pitch angle of blades at the phase of minimum pitch, for forward propulsion, will be held at that which is the most efficient for such forward propulsion and necessary sustentation. But the ports 116 may be of such adequate flow capacity that the pilot is permitted some degree of adjustment of this by means of the sleeve 118 to secure the proper and adequate discharge flow through ports 116. It should be understood that it is contemplated that the blades will operate in the manner of helicopter blades in normal flight, and the design construction should be such as to achieve this and the most efficient use.

The blade axles 12 in this form are offset from the axis of rotation of rotor A and each blade axle 12 is oscillably mounted in a bearing 15ª formed with or fixed on hub 1ª, and each blade is held by a ball bearing against centrifugal pull as in the first form described. The form shown in Figs. 6–7, has also the same control by means of the air safety valve 55 and the air valve 56 for manual control of the flow of air to the cylinders 25, 105. The rotor operates in flight with blades actuated in the phase cycle of pitch angles, as described in connection with Fig. 3, and as is common to helicopters.

Referring to Fig. 8, this figure shows a mounting of two rotors A on the opposite ends of the air foil wing 126 which may be a relatively small air foil wing for assistance in sustentation in flight. Each rotor A has its individual rotor control as to its phase cycle by means of the shafts 38 (94) and hand wheels 44 (95), these being for control of the valve rod 33. When two rotors A are used as in Fig. 8, the torque counteracting air propeller as in Fig. 5 need not be used. Any mounting of any number of rotors A may be used in an aircraft construction.

It should be noted especially that the air foil blades 17 will, during phases of the cycle of rotation in which there is no positive forcing of the blades 17 into the positions of greater pitch angle, by air pressure in the cylinders causing such forcible movement, tend to be forced into the positions of the lesser pitch angle by the force of the air slip stream against the blades, and that therefore the coil springs 19 need not be used in all designs of the construction, the blades then automatically taking the positions of the lesser pitch angle. As shown in the drawings the positions of the lesser pitch angle is limited to that degree permitted by the movement of the pistons in cylinders 25 and that this limitation should be that which permits auto-rotation in case of engine failure.

I contemplate that the controls for any number of the units such as A, may be combined so that there may be unitary control, which may be effected by any piping means for the air conduits and controls which will permit one valve such as 56 to control all units, or any means jointly affecting control rods 72 for instance may be jointly controlled by any means. The control means shown is merely one type of means for that purpose. The operating pressure responsive means such as cylinders 25 and pistons 24, which may otherwise be designated as fluid pressure motor means, may be any type of such pressure responsive means and linked with the blades by any means performing the functions described.

While I have shown particular devices and combinations of devices in the illustration of my invention, I contemplate that other devices and combinations of devices may be utilized in the realization of my invention, without departing from the spirit and contemplation thereof.

What I claim is:

1. In an air foil rotor for aircraft, a rotor mounting means fixed on an aircraft, a rotor hub mounted to rotate on the rotor mounting means and having a plural number of airfoil blades, each secured by one end in a bearing in the rotor hub, each said airfoil blade being oscillative in its said bearing in the rotor hub on an axis substantially radially of the rotor hub for change of pitch angle, a plural number of fluid pressure motor means, one associated with each blade and each mounted on and carried with the rotor hub and interposed and operable between the blade and the rotor hub to effect one phase of the oscillative movement of the blade in its said bearing in the rotor hub; means operatively interposed between each said blade and said rotor hub to yieldably induce the opposite phase of the oscillative movement of the blade; a source of fluid under pressure; a fluid distributing means connected with the source of fluid under pressure to receive fluid under pressure and comprising, a normally stationary valve, normally fixed to be stationary with the rotor mounting means and having its axis coincidental with the axis of the rotor hub, and a valve housing mounted on the rotor hub and axially coincidental with the axis of the rotor hub and circumferentially enclosing the normally stationary valve and carried with the rotor hub to rotate about the normally stationary valve, the said valve housing having a plural number of port means, one leading to each fluid pressure motor means, the said valve having a port means in the valve to connect in rotation of the valve housing with each said port means of the valve housing, the said port means of the valve housing and of the valve arranged to effect distribution of the fluid under pressure to the fluid pressure motor means cyclically according to the rotation of the valve housing about the normally stationary valve and to effect discharge of fluid from the fluid pressure motor means cylically and in phases opposite to the phases in which the fluid under pressure is distributed to the fluid pressure motor means.

2. The structure as specified in claim 1, and in combination: a common discharge chamber to which the discharge from all of the fluid pressure motor means is led in discharge phases and a common discharge port discharging from the common discharge chamber and a discharge control valve for the common discharge port arranged to increase or diminish the freedom of discharge from the common discharge chamber.

3. The structure as specified in claim 1, and in combination: means to increase or diminish the pressure of the fluid delivered to the fluid pressure motor means through the distributing means, and a common discharge chamber to which the discharge from all of the fluid pressure motor means is led in discharge phase and a common discharge port from the discharge chamber and a discharge control valve for the common discharge port arranged to increase or diminish the freedom of discharge from the common discharge chamber.

4. The structure as specified in claim 1, and in combination: a common discharge chamber to which the discharge from all of the pressure responsive means is led in discharge phases and a common discharge port discharging from the common discharge chamber and a discharge control valve for the common discharge port arranged to increase or diminish the freedom of discharge from the common discharge chamber, the common discharge port and the common discharge control valve having axes coincidental with the axis of the rotor hub, the common discharge control valve being movable along the said axis for exercise of its control function.

5. In an airfoil rotor for aircraft, a rotor mounting means fixed on an aircraft, a rotor hub mounted to rotate on the rotor mounting means and having a plural number of airfoil blades, each secured by one end in a bearing in the rotor hub, each said airfoil blade being oscillative in its said bearing in the rotor hub on an axis substantially radially of the rotor hub for change of pitch angle, a plural number of fluid pressure motor means, one associated with each blade and each mounted on and carried with the rotor hub and interposed and operable between the blade and the rotor hub to effect one phase of the oscillative movement of the blade in its said bearing in the rotor hub; means operatively interposed between each said blade and said rotor hub to yieldably induce the opposite phase of the oscillative movement of the blade; a source of fluid under pressure; a fluid distributing means connected with the source of fluid under pressure to receive fluid under pressure and comprising, a normally stationary valve, normally fixed to be stationary with the rotor mounting means and having its axis coincidental with the axis of the rotor hub, and a valve housing mounted on the rotor hub and axially coincidental with the axis of the rotor hub and circumferentially enclosing the normally stationary valve and carried with the rotor hub to rotate about the normally stationary valve, the said valve housing having a plural number of conducting port means, one leading to each fluid pressure motor means the said valve having a distributing port means in the valve to connect in rotation of the valve housing with each said conducting port means of the valve housing, the conducting port means of the valve housing and the distributing port means in the valve arranged to effect distribution of the fluid under pressure to the fluid pressure motor means cyclically according to the rotation of the valve housing about the normally stationary valve; the said valve having a discharge port means in the valve to connect, in rotation of the valve housing, with each said conducting port means of the valve housing, the said conducting port means of the valve housing and the said discharge port means of the valve arranged to effect discharge of the fluid from the fluid pressure motor means cyclically in phases opposite to the phases of delivery of fluid under pressure to the fluid pressure motor means.

6. The structure as specified in claim 5, and in combination: the said common discharge control means including a common discharge chamber to which the discharge from all of the fluid pressure motor means is led in discharge phases and a common discharge port discharging from the common discharge chamber and a discharge control valve for the common discharge port arranged to increase or diminish the freedom of discharge from the common discharge chamber, the common discharge port and the common discharge control valve having axes coincidental with the axis of the rotor hub, the common discharge control valve being movable along the said axis for exercise of the control function.

7. In an airfoil rotor for aircraft, a rotor mounting means fixed on an aircraft, a rotor hub mounted to rotate on the rotor mounting means and having a plural number of airfoil blades, each secured by one end in a bearing in the rotor hub, each said airfoil blade being oscillative in its said bearing in the rotor hub on an axis substantially radially of the rotor hub for change of pitch angle, a plural number of fluid pressure motor means, one associated with each blade and each mounted on and carried with the rotor hub and interposed and operable between the blade and the rotor hub to effect one phase of the oscillative movement of the blade in its said bearing in the rotor hub; means operatively interposed between each said blade and said rotor hub to yieldably induce the opposite phase of the oscillative movement of the blade; a source of gaseous fluid as air under pressure and comprising a compressing means and an intake to the compressing means and an outlet for gaseous fluid under pressure; a fluid distributing means connected with the outlet for gaseous fluid under pressure from the compressing means to receive under pressure from the compressing means, the said fluid distributing means comprising, a normally stationary valve, normally fixed to be stationary with the rotor mounting means and having its axis coincidental with the axis of the rotor hub, and a valve housing mounted on the rotor hub and axially coincidental with the axis of the rotor hub and circumferentially enclosing the normally stationary valve and carried with the rotor hub to rotate about the normally stationary valve, the said valve housing having a plural number of port means, one leading to each fluid pressure motor means, the said valve having a port means in the valve to connect in rotation of the valve housing with each said port means of the valve housing, the said port means of the valve housing and of the valve arranged to effect distribution of the fluid under pressure to the fluid pressure motor means cyclically according to the rotation of the valve housing about the normally stationary valve and to effect discharge of fluid from the fluid pressure motor means cyclically and in phases opposite to the phases in which the fluid under pressure is distributed to the fluid pressure motor means.

8. In an airfoil rotor for aircraft, a rotor mounting means fixed on an aircraft, a rotor hub mounted to rotate on the rotor mounting means and having a plural number of airfoil blades, each secured by one end in a bearing in the rotor hub, each said airfoil blade being oscillative in its said bearing in the rotor hub on an axis substantially radially of the rotor hub for change of pitch angle, a plural number of fluid pressure motor means, one associated with each blade and each mounted on and carried with the rotor hub and interposed and operable between the blade and the rotor hub to effect one phase of the oscillative movement of the blade in its said bearing in the rotor hub; means operatively interposed between each said blade and said rotor hub to yieldably induce the opposite phase of the oscillative movement of the blade; a source of gaseous fluid as air under pressure and comprising a compressing means and an intake to the compressing means and an outlet for gaseous fluid under pressure; a fluid distributing means connected with the outlet for gaseous fluid under pressure from the compressing means to receive gaseous fluid under pressure from the compressing means, the said fluid distributing means comprising, a normally stationary valve, normally fixed to be stationary with the rotor mounting means and having its axis coincidental with the axis of the rotor hub, and a valve housing mounted on the rotor hub and axially coincidental with the axis of the rotor hub and circumferentially enclosing the normally stationary valve and carried with the rotor hub to rotate about the normally stationary valve, the said valve housing having a plural number of conducting port means, one leading to each fluid pressure motor means the said valve having a distributing port means in the valve to connect in rotation of the valve housing with each said conducting port means of the valve housing, the conducting port means of the valve housing and the distributing port means in the valve arranged to effect distribution of the fluid under pressure to the fluid pressure motor means cyclically according to the rotation of the valve housing about the normally stationary valve; the said valve having a discharge port means in the valve to connect, in rotation of the valve housing, with each said conducting port means of the valve housing, the said conducting port means of the valve housing and the said discharge port means of the valve arranged to effect discharge of the fluid from the fluid pressure motor means cyclically in phases opposite to the phases of delivery of fluid under pressure to the fluid pressure motor means.

9. The structure as specified in claim 8 and in combination: a common discharge control means in connection with the fluid distributing means, the said common discharge control means including a common discharge chamber to which the discharge from all of the fluid pressure motor means is led in discharge phases and a common discharge port discharging from the common discharge chamber and a discharge control valve for the common discharge port arranged to increase or diminish the freedom of discharge from the common discharge chamber, the common discharge port and the common discharge control valve having axes coincidental with the axis of the rotor hub, the common discharge control valve being movable along the said axis for exercise of the control function.

10. In an airfoil rotor for aircraft, a rotor mounting means fixed on an aircraft, a rotor hub mounted to rotate on the rotor mounting means and having a plural number of airfoil blades, each secured by one end in a bearing in the rotor hub, each said airfoil blade being oscillative in its said bearing in the rotor hub on an axis substantially radially of the rotor hub for change of pitch angle, a plural number of fluid pressure motor means, one associated with each blade and each mounted on and carried with the rotor hub and interposed and operable between the blade and the rotor hub to effect one phase of the oscillative movement of the blade in its said bearing in the rotor hub; means operatively interposed between each said blade and said rotor hub to yieldably induce the opposite phase of the oscillative movement of the blade; a source of fluid under pressure; a fluid distributing means connected with the source of fluid under pressure to receive fluid under pressure and comprising, a normally stationary cylindrical valve, normally fixed to be stationary with the rotor mounting means and having its axis coincidental with the axis of the rotor hub, and a cylindrical valve housing mounted on the rotor hub and axially coincidental with the axis of the rotor hub and circumferentially enclosing the normally stationary cylindrical valve and carried with the rotor hub to rotate about the normally stationary cylindrical valve, the said cylindrical valve housing having a plural number of port means, one leading to each fluid pressure motor means, the said valve having a port means in the valve to connect, in rotation of the valve housing, with each said port means of the valve housing, the said port means of the valve housing and of the valve arranged to effect distribution of the fluid under pressure to the fluid pressure motor means cyclically according to the rotation of the cylindrical valve housing about the normally stationary cylindrical valve and to effect discharge of fluid from the fluid pressure motor means cyclically and in phases opposite to the phases in which the fluid under pressure is distributed to the fluid pressure motor means.

11. In an airfoil rotor for aircraft, a rotor mounting means fixed on an aircraft, a rotor hub mounted to rotate on the rotor mounting means and having a plural number of airfoil blades, each secured by one end in a bearing in the rotor hub, each said airfoil blade being oscillative in its said bearing in the rotor hub on an axis substantially radially of the rotor hub for change of pitch angle, a plural number of fluid pressure motor means, one associated with each blade and each mounted on and carried with the rotor hub and interposed and operable between the blade and the rotor hub to effect one phase of the oscillative movement of the blade in its said bearing in the rotor hub; means operatively interposed between each said blade and said rotor hub to yieldably induce the opposite phase of the oscillative movement of the blade; a source of fluid under pressure; a fluid distributing means connected with the source of fluid under pressure to receive fluid under pressure and comprising, a cylindrical valve housing mounted on the rotor hub and axially coincidental with the axis of the rotor hub and circumferentially enclosing a cylindrical valve space and carried with the rotor hub to rotate with the rotor hub, a normally stationary cylindrical valve, normally fixed to be stationary with the rotor mounting means and having its axis coincidental with the axis of the rotor hub, the said normally stationary cylindrical valve dividing the cylindrical valve space into a fluid pressure chamber on one side of the valve and a fluid discharge chamber on the other side of the valve; the said cylindrical valve housing having a plural number of distribution ports, one leading to each fluid pressure motor means, and having a plural number of discharge ports one leading to each fluid pressure motor means; the said cylindrical valve having a port means in the valve to connect, in rotation of the valve housing, with each said distributing port and each said discharge port of the valve housing, the said distribution ports and discharge ports and port means being arranged to effect distribution of the fluid under pressure to the fluid pressure motor means cyclically according to the rotation of the valve housing about the normally stationary cylindrical valve, and arranged to effect discharge of the fluid from the fluid pressure motor means cyclically in phases opposite to the phases of delivery of fluid under pressure to the fluid pressure motor means; and a common discharge port for discharge of fluid from the fluid discharge chamber.

12. The structure as specified in claim 11, and in combination: a common discharge control means in connection with the fluid distributing means, the common discharge control means including a common discharge control valve arranged with the common discharge port to increase or diminish the freedom of discharge, the common discharge port discharging the gaseous fluid.

References Cited in the file of this patent

UNITED STATES PATENTS

| Number | Name | Date |
|---|---|---|
| 1,870,928 | Smith | Aug. 9, 1932 |
| 2,041,789 | Stalker | May 26, 1936 |
| 2,364,096 | Platt | Dec. 5, 1944 |
| 2,394,846 | Cox, Jr. | Feb. 12, 1946 |
| 2,427,939 | Woods | Sept. 23, 1947 |
| 2,505,759 | Faulkner | May 2, 1950 |
| 2,530,276 | Weir | Nov. 14, 1950 |
| 2,547,721 | Stalker | Apr. 3, 1951 |
| 2,593,335 | Neale | Apr. 15, 1952 |